July 28, 1942.  A. G. BROWN  2,291,142
WEIGHING SCALE
Filed Feb. 7, 1941  2 Sheets-Sheet 1
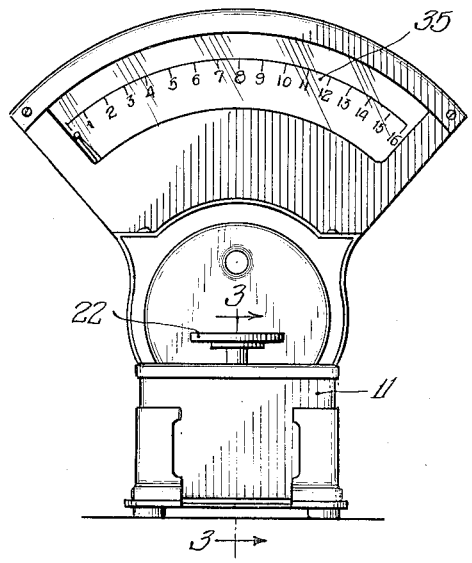
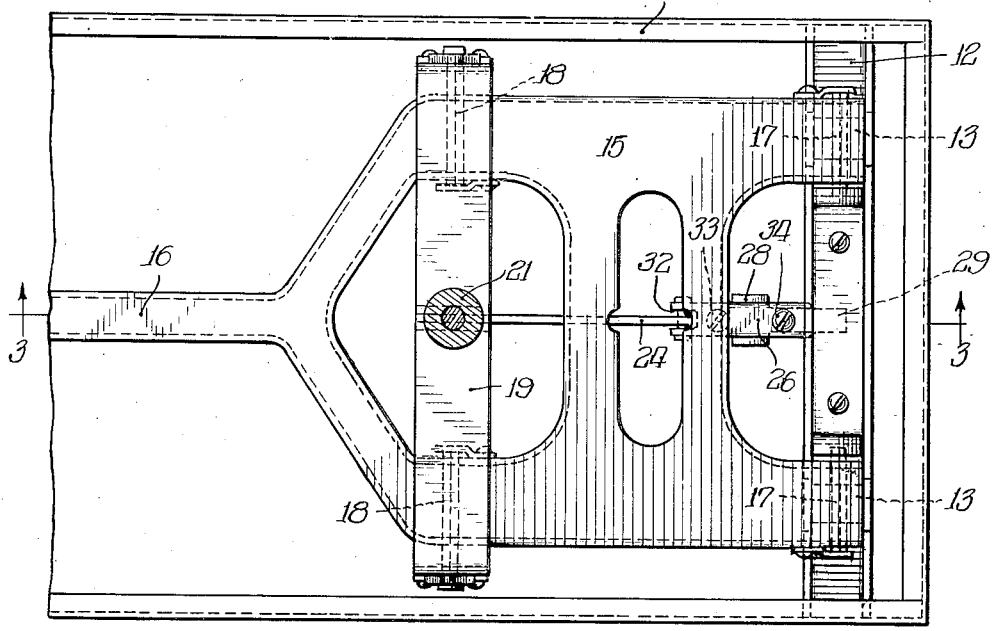
INVENTOR.
Andrew G. Brown,
BY Walter M. Fuller
atty.

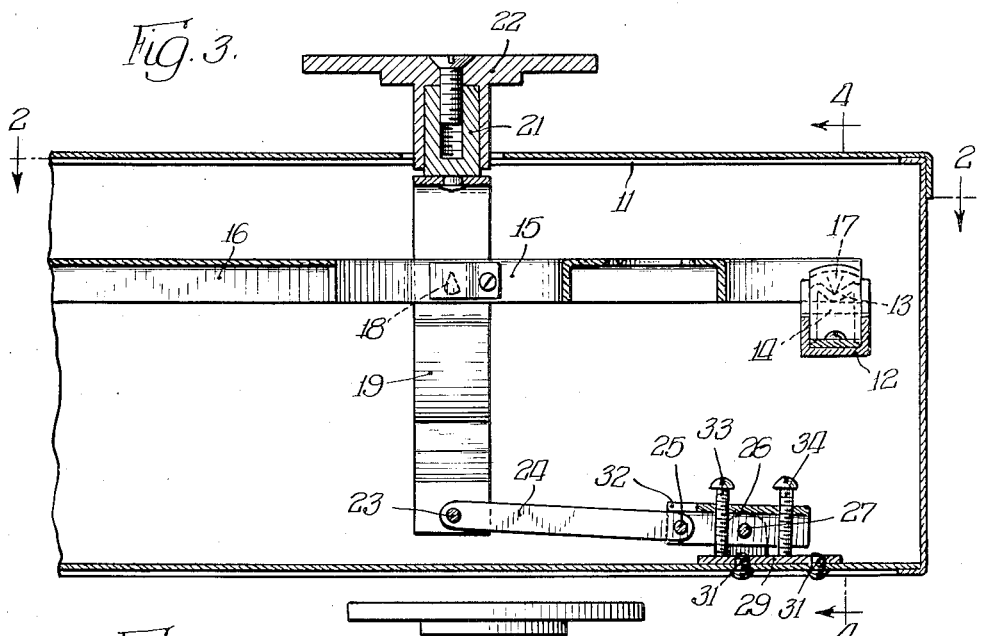
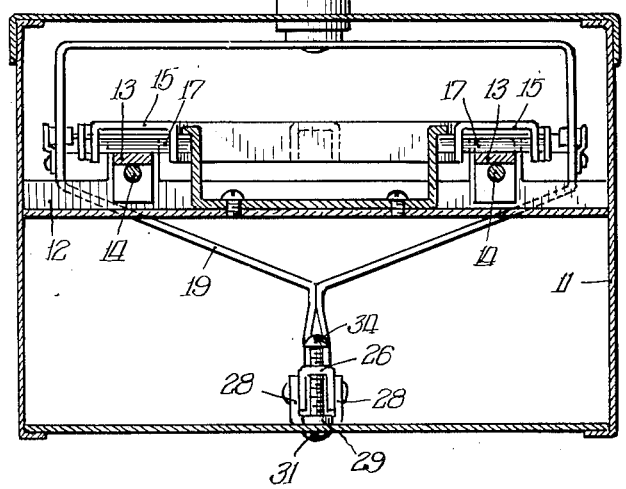

Patented July 28, 1942

2,291,142

UNITED STATES PATENT OFFICE 2,291,142

WEIGHING SCALE

Andrew G. Brown, Chicago, Ill., assignor to Triner Scale & Manufacturing Company, Chicago, Ill., a corporation of Illinois Application February 7, 1941, Serial No. 377,807

1 Claim. (Cl. 265—27)

The instant invention pertains to certain structural and functional betterments in weighing-scales and it relates more particularly to means for producing and preserving unusual sensitivity and accuracy in the weighing operation.

While the invention is not necessarily so limited or restricted in its satisfactory and useful employment, it is of especial advantage in scales of the type in which the member supporting the material or load to be weighed is mounted on a single, suitably-fulcrumed lever, as distinguished from a compound or double lever structure performing an analogous or comparable function.

The present invention provides improved yet simple and relatively-inexpensive means for supplying such high degree of sensitiveness and preciseness of action of the scale under all normal service conditions regardless of the location of the material or body being weighed on the plate or its equivalent load-supporting means.

An outstanding aim and purpose of the invention is to supply a mechanism which will efficiently and effectively produce the above-stated results and other desirable accomplishments.

To permit those acquainted with this art to fully understand the invention both from structural and functional standpoints, a present preferred embodiment thereof has been illustrated in the accompanying drawings, forming a part of this specification, and to which reference should be had in connection with the following detailed description and, for simplicity, like reference-numerals have been employed to designate the same parts throughout the several views of the drawings.

In these drawings:

Figure 1 is a face view or front elevation of the scale;

Figure 2 is a horizontal section through a portion only of the scale on line 2—2 of Figure 3;

Figure 3 is a vertical section on line 3—3 of Figure 2 or on an enlarged size on line 3—3 of Figure 1; and Figure 4 is a vertical cross-section on line 4—4 of Figure 3.

Referring to the drawings, it will be noted that the housing or casing 11 of the scale internally supports a transverse channel-bar 12, as by welding the ends of the latter to the inner faces of opposite, vertical walls of the housing, and such bar has mounted thereon a pair of aligned V-shaped saddles or supports 13, 13, each being capable of rocking adjustment transversely of the length of its V-recess on an appropriately-supported short shaft or screw 14, whereby these two elements are susceptible of automatic alignment.

A lever 15, in the form of a frame, with an extension or nose-piece 16 is fitted with a pair of knife-edge members 17, 17 occupying and rockable in the complementary saddles 13, 13, thereby providing an appropriate, anti-friction fulcrum-bearing for the lever.

By means of other suitable or comparable knife-edge bearings 18, 18, a yoke or frame 19, through the opening of which lever 15 extends, is pivotally mounted on and supported by lever 15 a substantial distance in advance of the lever-fulcrum 13, 17, the middle of the top bar of such yoke carrying an upstanding stud 21 which projects up through an opening or aperture in the top wall of the casing or housing 11, the upper end of such stud having mounted thereon a circular plate or other flat element 22 on which the material or body to be weighed is placed.

As is clearly illustrated, the lower middle portion of the yoke 19 is hinged at 23 to a check-link 24, the opposite end of which is similarly hinged at 25 to one end of an arm 26 of inverted U-shape in cross-section and rockingly mounted near the middle of its length on a hinge-pin 27 supported in upright, spaced-apart ears 28, 28 of a bracket whose base 29 is secured to the bottom wall of the casing by suitable screws 31, 31.

The web of arm 26 at that end thereof to which the check-link is hinged is cut away at 32 to avoid conflict or contact with the link and to afford the latter freedom of rocking movement.

As the lever 15 changes its position by reason of the presence or absence of a load, or due to loads of different amounts or values imposed thereon through its associated yoke 19, the position of the yoke must be varied with reference to such lever in order to maintain the horizontality of the upper surface of the member 22 carrying the body undergoing the weighing operation and such check-link structure performs such function, but this is a matter of refinement and delicacy to assure accurate weighing under all conditions of the presence and location of the body being weighed on its supporting member 22 of the scale.

To assure exactitude and precision in the weighing-operation, the arm 26 is equipped with two screws 33, 34 extended downwardly through screw-threaded holes in the web of the arm on opposite sides, front and back, of the hinge-pin 21.

By turning these two screws, which are readily accessible due to their upright positions and because of the apertures or recesses through the lever, and with the lower ends of the screws in engagement with the bracket-base 29, the position of hinge-pin 25 may be positively varied with accuracy and maintained fixedly in the desired position to accomplish the stated results.

It will be noticed that the construction is such that the hinged link 24 in performing its function is confined in so doing to vertical movement only.

Owing to more or less small, structural variations in scales of like construction, that is due to slight or minor differences in organization in their manufacture, it is practically impossible to make the lower mounting for the check-link of fixed parts and at the same time preserve the demanded accuracy of the required weighing-operation.

The nose-piece or extension 16 of the lever 15 is connected to counterbalance weight-mechanisms and to a pointer or index cooperating with the graduated-scale 35, but inasmuch as these parts of the scale are not novel and are well-known in the art, they have not been illustrated.

The present scale from which the drawing was made is one of outstanding delicacy and correctness in operation, and, whereas the total capacity of the scale is one-pound avoirdupois, it is nevertheless capable of weighing within an accuracy of five grains due in large measure to the incorporation in its composition or make-up of the structure constituting the subject-matter of the present invention as defined by the appended claim.

Whereas above the present preferred embodiment of the invention has been presented in detail, those skilled in the art will readily understand that the invention is not necessarily limited or restricted to the precise and exact details of such structure and that modifications and changes therein may be resorted to without departure from the heart and principles of the invention.

I claim:

In a weighing-scale having a base, counterbalancing-means, weight-indicating means, a lever arranged to transmit the weight of the load undergoing weighing to said counterbalancing and weight-indicating means, an upright yoke hinged on said lever with a horizontal axis, means carried by the upper portion of said yoke to receive the body to be weighed, and a check-link device associated with said yoke, the combination of novel features of a bracket fixedly mounted on said base, an arm of inverted U-shape in cross-section hinged at an intermediate point of its length on said bracket by a hinge-pin occupying aligned holes in the parallel flanges of said arm, means hinging one end portion of said check-link between the flanges of an end portion of said arm on a horizontal axis transverse to said check-link by a hinge-pin occupying aligned holes in said check-link and the flanges of said arm, a hinge-pin with a horizontal axis transverse to said check-link hinging the opposite end portion of said check-link to the lower portion of said yoke, and a pair of adjustment-screws threaded through holes through the web of said arm on opposite sides of the hinge connection of said arm with said bracket and with their lower ends bearing against the upper face of the base of said bracket and adapted to maintain the adjusted position of said arm relative to said bracket such that the horizontality of said body-receiving means is retained in all operative positions of said lever and yoke, the hinge connections of said check-link with said arm and yoke confining it to movement in a vertical plane only.

ANDREW G. BROWN.